United States Patent [19]
Kabeya et al.

[11] Patent Number: 6,148,647
[45] Date of Patent: Nov. 21, 2000

[54] DRUM TYPE WASHING MACHINE

[75] Inventors: Katsuhei Kabeya, Komaki; Fumitaka Yamazaki, Seto, both of Japan

[73] Assignee: Kabushiki Kaisha Toshiba, Kanagawa, Japan

[21] Appl. No.: 09/114,472

[22] Filed: Jul. 13, 1998

[30] Foreign Application Priority Data

Jul. 11, 1997 [JP] Japan ................................ 9-186764

[51] Int. Cl.⁷ .................................................. D06F 37/30
[52] U.S. Cl. ................................................................ 68/140
[58] Field of Search .............................. 68/12.14, 12.16, 68/23.1, 24, 140

[56] References Cited

U.S. PATENT DOCUMENTS

| 4,841,207 | 6/1989 | Cheyne ..................... 388/811 |
| 4,946,242 | 8/1990 | Tanno et al. .............. 350/96.15 |
| 4,991,247 | 2/1991 | Castwall et al. ................ 8/158 |
| 5,463,883 | 11/1995 | Pellerin et al. ............... 68/140 |
| 5,824,114 | 10/1998 | Pyo ........................... 68/12.14 X |

FOREIGN PATENT DOCUMENTS

| 9674259 | 6/1997 | Australia . |
| 9675404 | 6/1997 | Australia . |
| 0413915A1 | 2/1991 | European Pat. Off. . |
| 0657575A1 | 6/1995 | European Pat. Off. . |
| 0779388A2 | 6/1997 | European Pat. Off. . |
| 0780507A2 | 6/1997 | European Pat. Off. . |

*Primary Examiner*—Philip R. Coe
*Attorney, Agent, or Firm*—Pillsbury Madison & Sutro Intellectual Property Group

[57] ABSTRACT

A drum type washing machine includes an outer cabinet, a water tub elastically supported in the outer cabinet, a drum type rotatable tub provided in the water tub to be rotated about a horizontal axis, a rotatable tub shaft extending outward from a central portion of an end plate of the rotatable tub, and an outer rotor type motor for driving the rotatable tub via the rotatable tub shaft. The motor includes a rotor mounted on an outer end of the rotatable tub shaft and a stator mounted on the water tub or a member fixed to the water tub so as to be disposed inside the rotor.

12 Claims, 9 Drawing Sheets

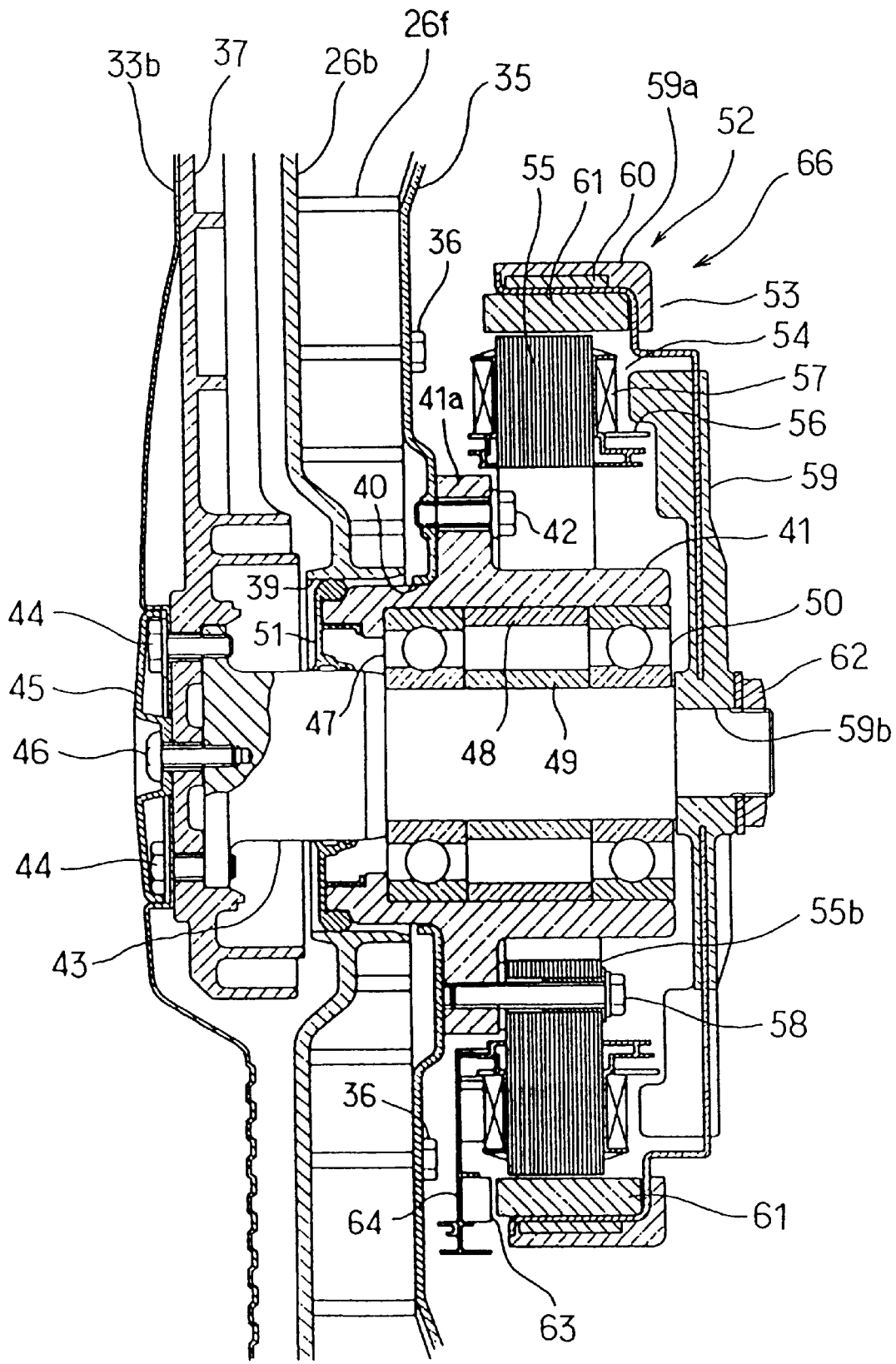
F I G. 2

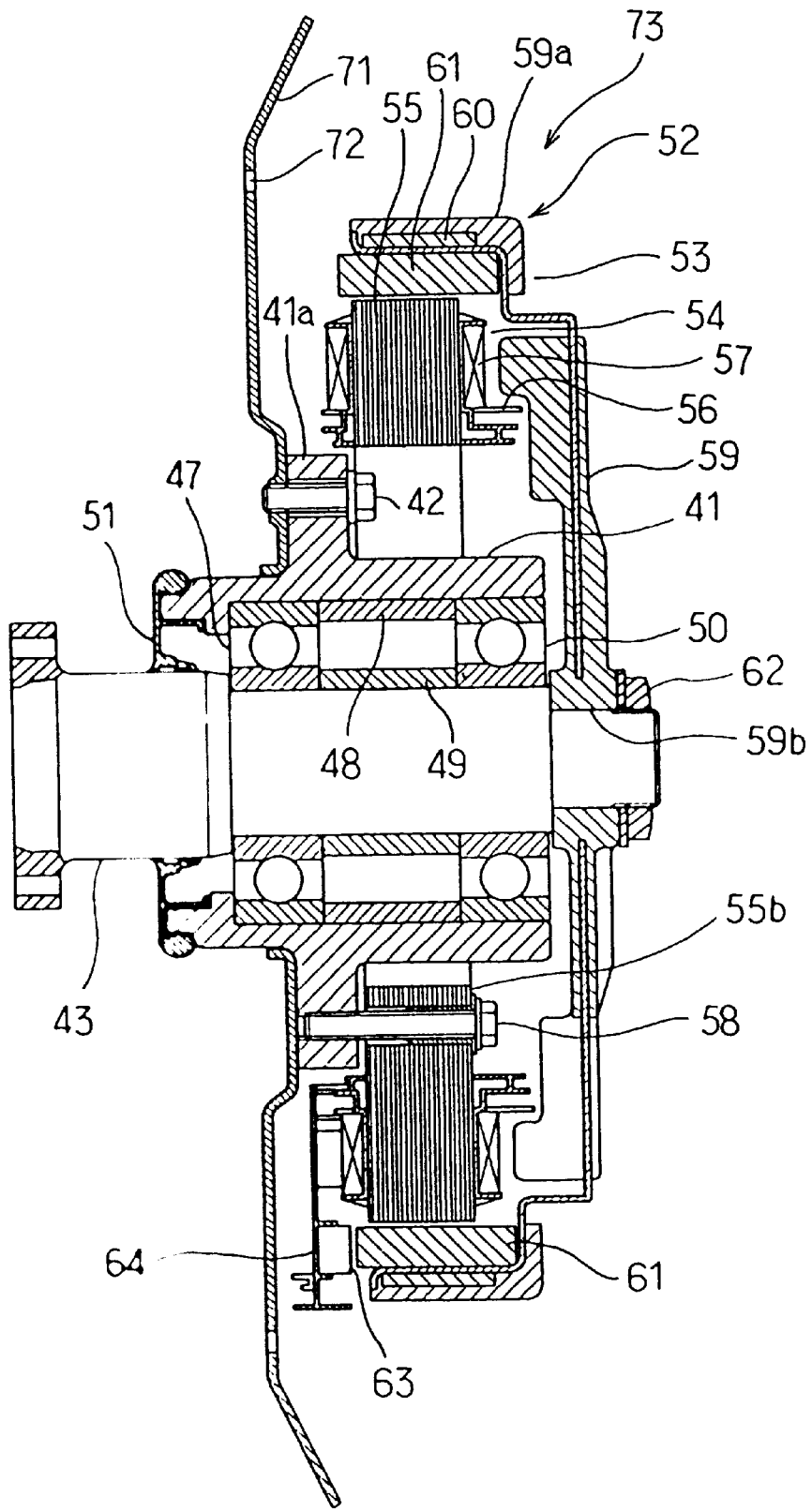
F I G. 5

DRUM TYPE WASHING MACHINE

BACKGROUND OF THE INVENTION

1. Field of the Invention

This invention generally relates to a drum type washing machine including a rotatable tub rotated about a horizontal axis, and more particularly to such a drum type washing machine provided with an improved driving mechanism for driving the rotatable tub.

2. Description of the Prior Art

FIG. 9 illustrates a conventional drum type washing machine. An outer cabinet 1 of the shown washing machine encloses a water tub 2 elastically supported by a plurality of suspension mechanisms 3. A rotatable tub 4 is provided in the water tub 2 to be rotated about a horizontal axis. A bearing housing 6 is screwed to a rear end of the water tub 2. The bearing housing 6 holds two bearings 7 and 8 supporting a rotatable tub shaft 5 of the rotatable tub 4. A driven pulley 9 is mounted on a rear end of the rotatable tub 5. An electric motor 11 is mounted on a motor mount 10 further mounted on a lower circumferential wall of the water tub 2. The motor 11 includes a rotational shaft 12 to which a driving pulley 13 is mounted. A transmission belt 14 extends between the driven pulley 9 and the driving pulley 13.

Upon rotation of the rotational shaft 12 of the motor 11, a rotating force is transmitted via the driving pulley 13, the belt 14 and the driven pulley 9 to the rotatable tub shaft 5, so that the rotatable tub 4 is rotated. However, this transmitting construction increases the number of parts therefor. As a result, the assembling work is complicated and accordingly, the manufacturing cost is increased.

In the washing machine of the above-described type, the driven pulley 9, the driving pulley 13 and the belt 14 produce vibration or oscillation during the transmission of the motor rotating force. In particular, the belt 14 is susceptible to slippage in its portions between it and the driving pulley 13 and between it and the driven pulley 9 when the motor 11 is rotated at high speeds. The belt 14 rocks upon slippage. The rocking of the belt 14 increases the vibration produced by each of the driven pulley 9, the driving pulley 13 and the belt 14, resulting in a loud offensive noise.

Furthermore, the motor 11 is disposed under the water tub 2. This disposition complicates the maintenance of the motor 11 including repair, inspection and replacement thereof. Additionally, when the washing machine is installed on a waterproof pan, a scupper of the pan is sometimes clogged such that a water level in the pan is increased. In this case, there is a possibility that the motor 11 may be exposed to water drops or soaked in water. In view of this drawback, the washing machine needs to be provided with an abnormal water level detector and an electrical protection device. These devices further increase the manufacturing cost of the washing machine.

The washing machine of the above-described type has been provided with detecting means for detecting rotation of the rotatable tub 4. An amount of laundry to be washed, an amount of laundry to be dried and an amount of unbalance of the rotatable tub are determined on the basis of the results of detection by the detecting means. Accuracy in the detection of the detecting means or accuracy in the detection of an amount of laundry to be washed or the like is affected by a tension and slippage of the belt 14 to a large extent. In view of this problem, the tension and dimensions of the belt 14 need to be strictly controlled. This reduces the manufacturing efficiency of the washing machine.

SUMMARY OF THE INVENTION

Therefore, an object of the present invention is to provide a drum type washing machine which has a simplified mechanism for driving the rotatable tub and in which the vibration and noise produced during rotation of the rotatable tub can be reduced.

Another object of the invention is to provide a drum type washing machine in which the rotatable tub driving mechanism can readily be repaired and inspected and the manufacturing efficiency can be improved.

The present invention provides a drum type washing machine comprising an outer cabinet, a water tub elastically supported in the outer cabinet, a drum type rotatable tub provided in the water tub to be rotated about a horizontal axis, the rotatable tub including an end plate having at least a central portion thereof provided with a generally flat mounting portion, a rotatable tub shaft extending outward from the central portion of the end plate of the rotatable tub, the rotatable tub shaft having one of two ends located at the rotatable tub side and provided with a generally flat abutting portion which is caused to abut against the mounting portion of the end plate of the rotatable tub and mounted thereto and an outer rotor type motor driving the rotatable tub via the rotatable tub shaft and including a rotor mounted on the other end of the rotatable tub shaft and a stator mounted on the water tub or a member fixed to the water tub so as to be disposed inside the rotor.

According to the above-described construction, a rotating force of the motor is directly transmitted to the rotatable tub shaft. Consequently, the mechanism for driving the rotatable tub can be simplified and accordingly, the manufacturing cost of the washing machine can be reduced. Furthermore, since the motor is disposed in the rear of the water tub, the efficiency in repairing and inspecting the motor can be improved. Additionally, the motor is prevented from being exposed to water drops or soaked in water since it is located higher as compared with the prior art. This construction requires no abnormal water level detector or no electrical protection device. Consequently, the manufacturing cost can further be reduced.

In a preferred form, the rotatable tub shaft also serves as a rotor shaft of the motor. This construction reduces the number of parts as compared with the case where the rotatable tub shaft and the rotor shaft are discrete from each other. Consequently, the rotatable tub driving mechanism can further be simplified.

In another preferred form, the drum type washing machine further comprises a bearing element which supports the rotatable tub shaft and including a part thereof located in the stator. This construction provides a compact rotatable tub driving mechanism.

In further another preferred form, the drum type washing machine further comprises a bearing element which supports the rotatable tub shaft, a bearing housing which holds the bearing element and on which the stator is mounted.

In further another preferred form, the outer cabinet and the water tub have front openings respectively and the rotatable tub is drawably accommodated through the front openings of the outer cabinet and the water tub into the water tub.

According to the above-described construction, the rotatable tub can be put into and taken out of the water tub after the water tub has been disposed in the outer cabinet and the rotatable tub has been disposed in the water tub. Consequently, the rotatable tub can readily be taken out of the water tub even when the interior of the water tub should be checked for the reason that laundry enters a space between the water tub and the rotatable tub or for other reasons.

BRIEF DESCRIPTION OF THE DRAWINGS

Other objects, features and advantages of the present invention will become clear upon reviewing the following description of the preferred embodiments thereof with reference to the accompanying drawings in which:

FIG. 2 is an enlarged longitudinal section of a mechanism for driving the rotatable tub;

FIG. 5 is an enlarged longitudinal section of the driving mechanism of the drum type washing machine of a second embodiment in accordance with the invention;

DETAILED DESCRIPTION OF THE PREFERRED EMBODIMENTS

Figure 1:
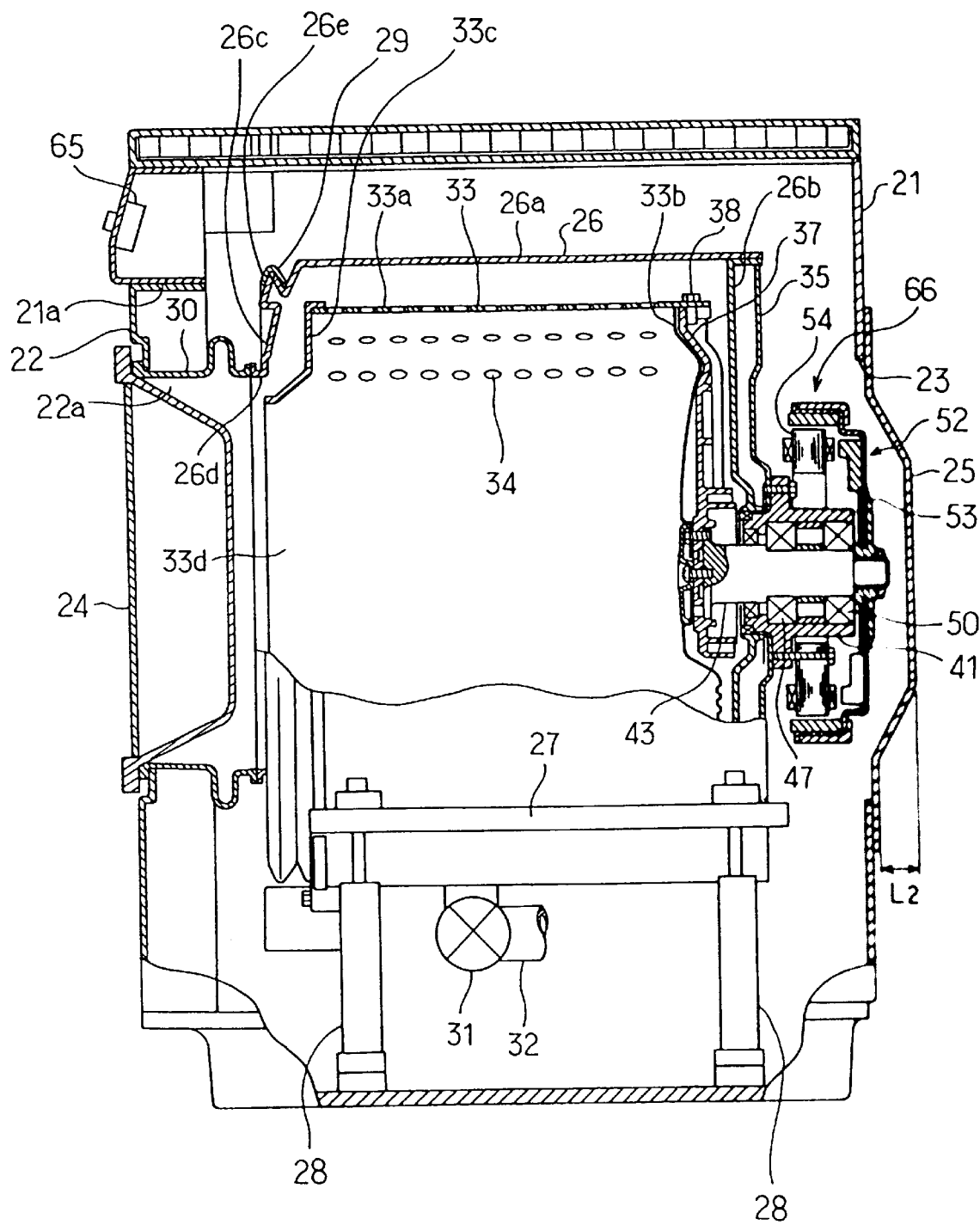
FIG. 1 is a longitudinal section of the drum type washing machine of a first embodiment in accordance with the present invention.

A first embodiment of the present invention will be described with reference to FIGS. 1 to 4. Referring to FIG. 1, a drum type washing machine with a drying function embodying the invention is shown. The washing machine comprises an outer cabinet 21 having a rectangular front opening 21a. A rectangular front plate 22 is detachably attached by screws (not shown) to a front wall of the outer cabinet 21 defining the opening 21a. The front plate 22 has an access opening 22a through which laundry is put into and taken out of a rotatable tub 33. A door 24 is provided for closing and opening the access opening 22a. The outer cabinet 21 has a working opening 23 formed in a central rear wall thereof. A back plate 25 is detachably mounted on the rear wall of the outer cabinet 21 by screws (not shown) so as to close the working opening 23.

A water tub 26 made of a plastic is provided in the outer cabinet 21. The water tub 26 is elastically supported on the bottom of the outer cabinet 21 by a plurality of, for example, four, suspension mechanisms 28 two of which are shown in FIG. 1. The water tub 26 includes a cylindrical circumferential wall 26a, a rear end plate 26b welded to the rear of the circumferential wall 26a, and a front end plate 26c detachably mounted on the front of the circumferential wall 26a with a band 29 having a V-shaped section being interposed therebetween.

The front end plate 26c of the water tub 26 has a central opening 26d. The band 29 fastens a rear end of the front end plate 26c and a front end of the circumferential wall 26a tight, thereby providing a watertight seal therebetween. The band 29 is loosened so that the front end plate 26c is detached from the circumferential wall 26a, whereupon an opening 26e is defined in the front of the circumferential wall 26a. An opening 26d of the front end plate 26c is connected to the access opening 22a by bellows 30.

The water tub 26 has a drain hole (not shown) formed in the bottom thereof. A drain valve 31 is connected to the drain hole, and a drain hose 32 is connected to the drain valve 31. A generally drum-like rotatable tub 33 made of a stainless steel is provided in the water tub 26 to be rotatable about a horizontal axis. An outer diameter of the rotatable tub 33 is slightly smaller than an inner diameter of the front opening 26e of the circumferential wall 26a of the water tub 26. The rotatable tub 33 includes a circumferential wall 33a, a rear end plate 33c constituting an end plate of the rotatable tub in the invention, and a front end plate 33c constituting the other end plate thereof. The front end plate 33c has a central opening 33d. The rear and front end plates 33b and 33c are welded to the rear and front of the circumferential wall 33a respectively. The rotatable tub 33 serves as a wash tub, a dehydration tub, and a drying drum. The circumferential wall 33a of the rotatable tub 33 has a number of holes 34 serving as both air and water holes.

A mechanism 66 for driving the rotatable tub 33 is provided on the rear end plate 26b of the water tub 26. The rotatable tub driving mechanism 66 will now be described in detail with reference to FIGS. 2 and 3. The rear end plate 26b of the water tub 26 is formed with a number of ribs 26f as shown in FIG. 2. A reinforcing plate 35 made of a metal such as stainless steel is secured to rear ends of the ribs 26f by a plurality of bolts 36 two of which are shown in FIG. 2. The rear end plate 26b serves as a face opposed to the rear end plate 33b of the rotatable tub 33 in the invention. A rotatable tub support 37 made of a metal is secured to the rear end plate 33b of the rotatable tub 33 by a plurality of bolts 38 one of which is shown in FIG. 1. The support 37 has a larger thickness than the rear end plate 33b and also serves to reinforce the rear end plate 33b.

Two housing insertion holes 39 and 40 are formed in the central portions of the rear end plate 26b of the water tub 26 and the reinforcing plate 35 respectively. A front end of a cylindrical bearing housing 41 is inserted in the holes 39 and 40. The bearing housing 41 has a mounting portion 41a formed on the outer circumference thereof. The mounting portion 41a is fixed to the reinforcing plate 35 by a plurality of bolts 42 one of which is shown in FIG. 2.

Ball bearings 47 and 50 serving as bearing element are fitted in the bearing housing 41 with outer and inner collars 48 and 49 being interposed between the ball bearings. A rotatable tub shaft 43 is supported by the ball bearings 47 and 50. A sealing member 51 is fitted in the housing insertion hole 39 so as to be located at the front end of the bearing housing 41, thereby providing a watertight seal between the rear end 26b of the water tub 26, and the bearing housing 41 and the rotatable tub shaft 43. The rotatable tub support 37 and the rear end plate 33b are secured to a front end of the rotatable tub shaft 43 by a plurality of bolts 44 one of which is shown in FIG. 2. Each bolt 44 is screwed from the inside of the rotatable tub 33 through the rear end plate 33b and the support 37 into the front end of the rotatable tub shaft 34. A cap 44 is mounted to the rear end plate 33b by a screw 46 so as to cover the heads of the bolts 44.

Figure 3:
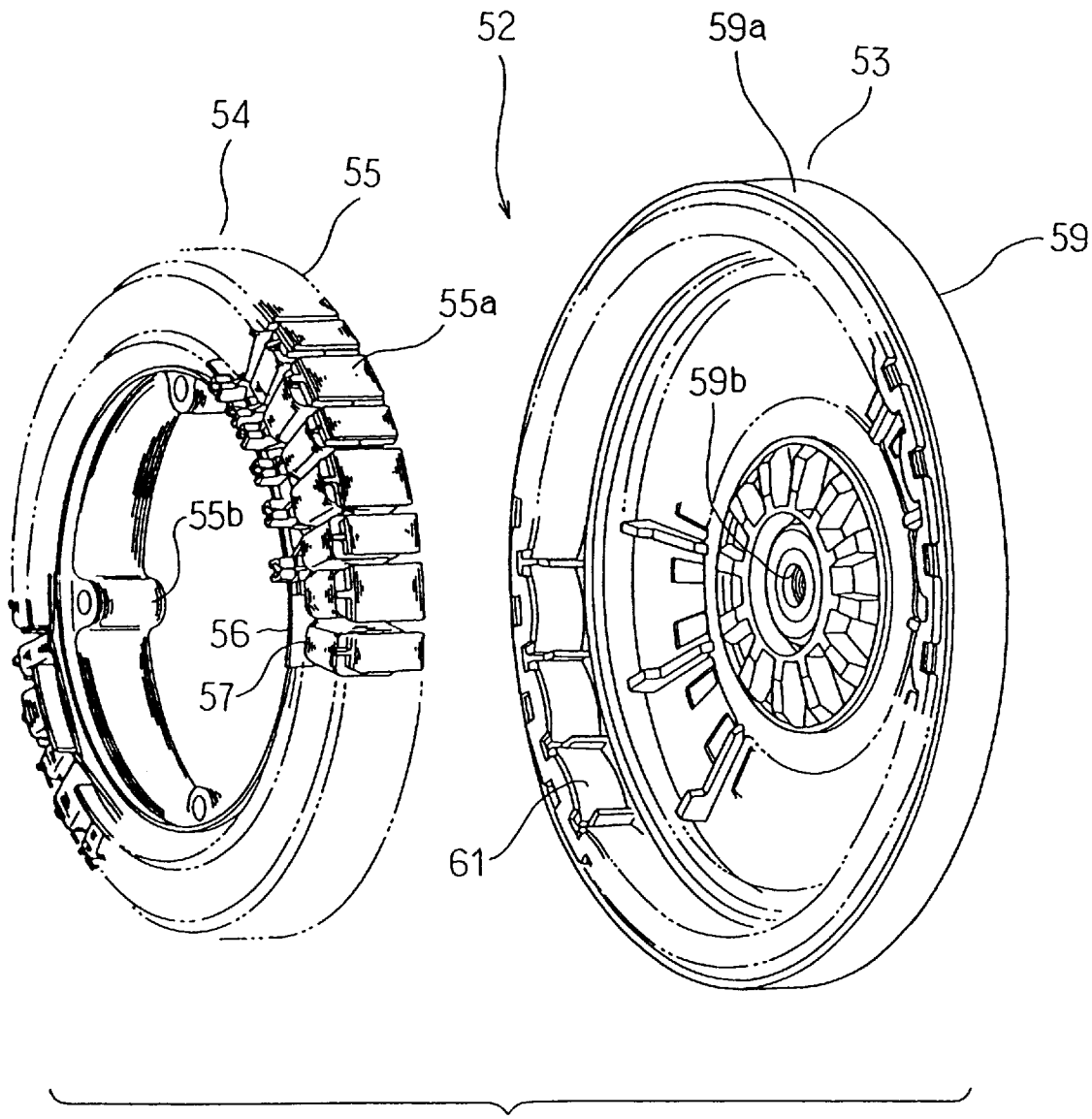
FIG. 3 is an exploded perspective view of the motor.

A stator 54 constituting a brushless motor 52 of the outer rotor type is fixed to the outer circumference of the bearing housing 41. The bearing housing 41 thus serves as a member fixed to the water tub 26 in the invention. The stator 54 includes a stator core 55 formed by stacking magnetic steel sheets, and windings 57 wound on teeth 55a protruding from the outer circumference of the stator core 55 with bobbins 56 being interposed therebetween, as shown in FIG. 3. A plurality of protrusions 55b are formed on the inner circumference of the stator core 55. The protrusions 55a are mounted to the mounting portion 41a of the bearing housing 41 by bolts 58 so that the stator 54 is fixed to the bearing housing 41.

A rotor 53 constituting the motor 52 is fixed to an outer end or rear end of the rotatable tub shaft 43 as shown in FIG. 2. The rotor 53 includes a housing 59 extending from the rear end of the rotatable tub shaft 43 toward the outer circumference of the stator 54, a yoke 60 provided along a circumference 59a of the housing 59, and magnetic pole forming magnets 61 secured to the inside of the circumference 59a. The housing 59 has a hole 59b formed in the center thereof. The rear end of the rotatable tub shaft 43 is fitted in the hole 59b. A portion of the rotatable tub shaft 43 projecting rearward from the hole 59b is fastened by a nut 62. A serration (not shown) is provided between the inner circumference of the hole 59b and the outer circumference of the rotatable tub shaft 43. Thus, the rotatable tub shaft 43 is rotated with the rotor 53. Accordingly, the rotatable tub shaft 43 also serves as a rotor shaft of the motor 52 in the embodiment.

A circuit board 64 is attached to the front of the stator core 55. A rotation sensor 63 is mounted on the circuit board 64. The rotation sensor 63 serves as a detector which detects a rotational speed of the rotatable tub 33. The rotation sensor 63 comprises a Hall IC, for example and disposed to be opposed to the magnets 61.

A sequence for assembly of the rotatable tub driving mechanism 66 will now be described. Assume that the front plate 22 and the front end plate 26c are detached and that the water tub 26 is provided in the outer cabinet 21. Further assume that the back plate 25 is detached from the outer cabinet 21. First, the ball bearing 47 is press fitted into the bearing housing 41 from the rear of the latter. In this state, the rotatable tub shaft 43 is inserted through the ball bearing 47 from the front of the latter. The outer and inner collars 48 and 49 are inserted into a space between the inner circumference of the bearing housing 41 and the rotatable tub shaft 43 from the rear of the bearing housing. The ball bearing 50 is then press fitted into the bearing housing 41. As the result of the above-described assembly sequence, the ball bearings 47 and 50 is held in the bearing housing 41 without differences between inner and outer rings, and the rotatable tub shaft 43 is supported by the ball bearings 47 and 50.

The bearing housing 43 into which the ball bearings 47 and 50, the outer and inner collars 48 and 49, and the rotatable tub shaft 43 have been assembled is then inserted through the working opening 23 into the outer cabinet 21 to thereby be fixed to the reinforcing plate 35. In this state, the rotatable tub 33 is accommodated through the openings 21a and 26e of the outer cabinet 21 and the water tub 26 into the water tub. The rear end plate 33b of the rotatable tub 26 and the support 37 are fixed to the front end of the rotatable tub shaft 34. On the other hand, the stator 54 is fixed to the outer circumference of the bearing housing 41. Furthermore, the rotor 53 is fixed to the rear end of the rotatable tub shaft 34. The rotatable tub driving mechanism 66 is thus assembled in the above-described sequence.

The above-described washing machine is provided with a mechanism for accomplishing the drying function, for example, a blower, a dehumidifier, and a heater, none of them being shown. Furthermore, a control device 65 is provided on the front top of the outer cabinet 1 as shown in FIG. 1. The control device 65 comprises a circuit mainly composed of a microcomputer and stores control programs for controlling washing, dehydrating and drying operations. The control device 65 detects an amount of laundry to be washed, an amount of laundry to be dried, and a degree of unbalanced state of the rotatable tub 33 on the basis of the results of detection by the rotation sensor 63.

When the motor 52 is energized so that the rotor 53 is rotated, the rotatable tub shaft 43 is rotated with the rotor 53, so that the rotatable tub 33 is rotated. In the prior art, the rotating force of the motor 11 is transmitted through the driving pulley 13, the belt 14 and the driven pulley 9 to the rotatable tub 44. Differing from the prior art, the embodiment provides the construction in which the rotation of the rotor 53 is directly transmitted to the rotatable tub 33. Consequently, since the number of parts constituting the rotatable tub driving mechanism 66 is reduced, the driving mechanism can be simplified and accordingly, the manufacturing cost of the washing machine can be reduced. Furthermore, vibration and noise produced during drive of the motor 53 can be reduced since the driving pulley 13, the belt 14 and the driven pulley 9 are unnecessary.

Furthermore, the overall driving mechanism 66 is disposed substantially in the central rear of the water tub 26. Accordingly, the driving mechanism 66 can be inspected and repaired and the parts thereof can be replaced when only the back plate 25 is detached from the outer cabinet 21. Moreover, since the motor is located higher as compared with the prior art, the motor 52 can be prevented from being exposed to water drops or soaked in water.

The rotatable tub 33 is driven by the outer rotor type motor 52 in the foregoing embodiment. Consequently, an increase in the depth of the washing machine due to the disposition of the driving mechanism 66 in the rear of the water tub 26 can be rendered smaller in the embodiment as compared with the case where the rotatable tub 33 is driven by a motor of the inner rotor type. The reason for this is as follows. A distance between the center of rotation of a rotor and its outer circumferential edge is shorter in the inner rotor type motor than in the outer rotor type motor when the outer rotor type motor has the same outer diameter as that of the inner rotor type motor. In order that the torque developed by the inner rotor type motor may be equal to that developed by the outer rotor type motor, an axial dimension of the inner rotor type motor should be rendered larger than that of the outer rotor type motor. Accordingly, the depth of the washing machine becomes larger than that in the prior art when an inner rotor type motor is disposed in the rear of the water tub 26 instead of the above-described motor 52.

Figure 4:
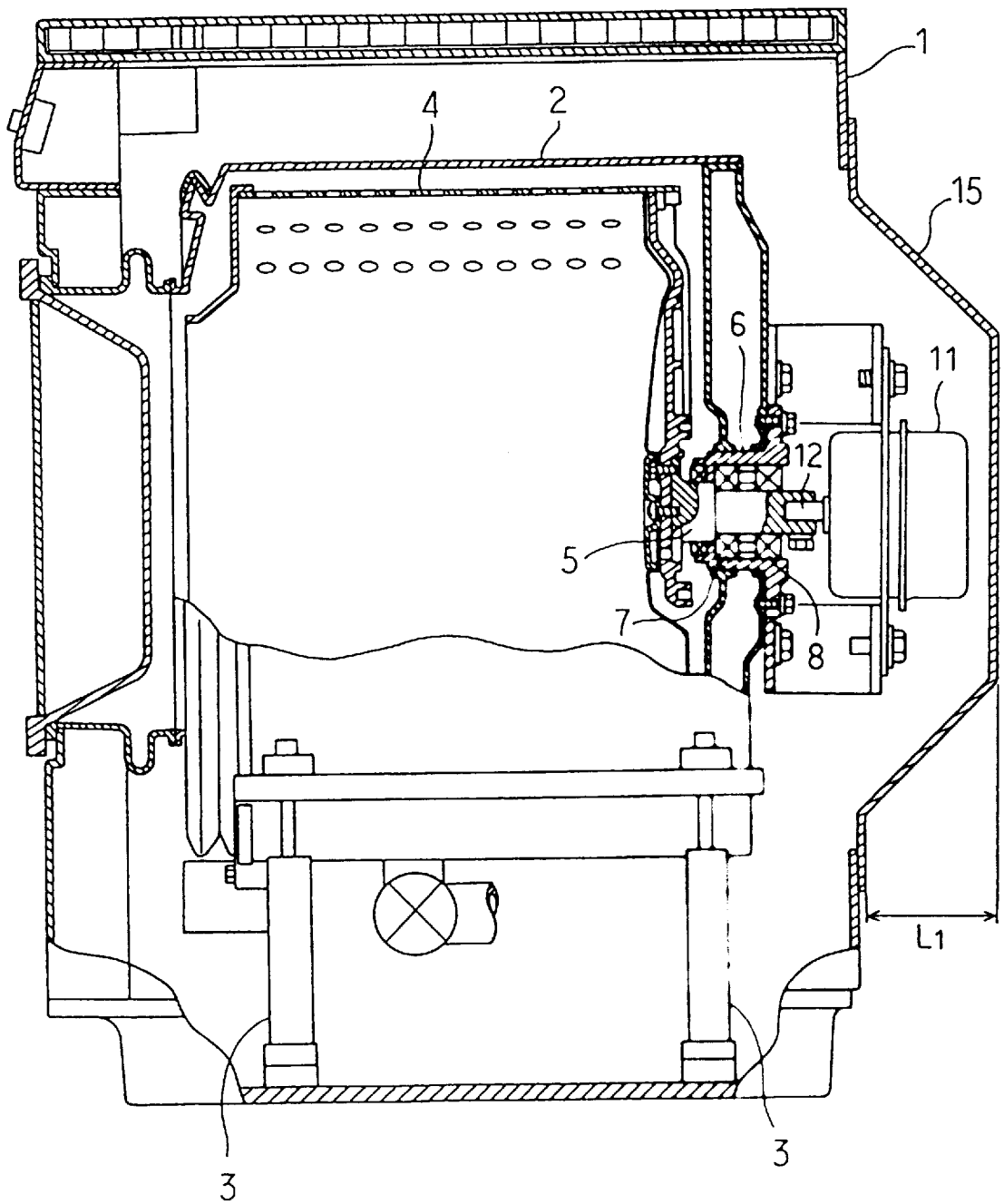
FIG. 4 is a longitudinal section of a drum type washing machine in which a rotational shaft of an inner rotor type motor is directly connected to a rotatable tub shaft.

FIG. 4 illustrates an example in which a rotational shaft 12 of an inner rotor type motor 11 is directly connected to a rotatable tub shaft 5 of a conventional washing machine. As obvious from the comparison of FIGS. 1 and 4, a protrusion dimension L2 of a back plate 15 of the washing machine shown in FIG. 4 is larger than a protrusion dimension L1 of the back plate 25 of the washing machine of the embodiment.

Furthermore, the rotating force of the motor 52 is directly transmitted to the rotatable tub 33. This improves accuracy in detection of the rotational speed of the rotatable tub 33 by the rotation sensor 63. Additionally, since a strict control of the tension and dimensions of a transmission belt as required in the prior art is unnecessary, the manufacturing efficiency can be improved.

The rotatable tub 33 can be taken out of the water tub 26 when the front plate 22 is detached from the outer cabinet 21, the front end plate 26c is detached from the water tub 26, and the screws 46 and the bolts 44 are loosened. Consequently, the rotatable tub 33 can readily be taken out of the water tub 26 for the inspection of the interior of the water tub 26 when a foreign matter such as laundry has entered a space between the water tub 26 and the rotatable tub 33, for example.

FIG. 5 illustrates a second embodiment of the invention. The differences between the first and second embodiments will be described. Identical or similar parts are labeled by the same reference symbols in the second embodiment as in the first embodiment. In the second embodiment, the components of the driving mechanism 66 are integrally assembled into a motor unit 73. The motor unit 73 includes a mounting plate 71 also serving as a reinforcing plate. The mounting plate 71 has a generally central insertion hole 71a. The front end of the bearing housing 41 is inserted into the insertion hole 71a. In this state, the bearing housing 41 is mounted on the mounting plate 71 by the bolts 42. The ball bearings 47 and 50, the outer and inner collars 48 and 50, and the rotatable tub shaft 43 are assembled into the bearing housing 41 in the same sequence as in the first embodiment.

The stator 54 is mounted on the mounting portion 41a of the bearing housing 41 in the same manner as in the first embodiment. Also, the rotor housing 59 is fixed to the rear end of the rotatable tub shaft 43. The mounting plate 71 is formed with mounting holes 72 each located nearer to the outer circumference than the stator 54 and the rotor 53.

The front end of the bearing housing 41 is inserted into the insertion hole 39, and the mounting plate 71 is placed along the backside of the rear end plate 26b of the water tub 26. In this state, bolts (not shown) are screwed into the mounting holes 72 and bosses (not shown) formed on the water tub 26, so that the motor unit 73 is fixed to the water tub 26.

According to the above-described construction, the motor unit 73 can be assembled independent of the assembly of the outer cabinet 21 and water tub 26. The assembly is restricted by a working space when the bearing housing 41, the motor 52, etc. are sequentially mounted on the rear end plate 26b of the water tub 26 for the assembly of the driving mechanism 66 as in the first embodiment. In the second embodiment, however, the assembly is free from such a restriction by a working space as in the first embodiment. Consequently, the working efficiency can be improved. Furthermore, in the repair or inspection of the motor unit 73, it is detached from the rear end plate 26b of the water tub 26, and the repair or inspection can be carried out in an open space. Consequently, a working efficiency in the repair or inspection can be improved.

The rotatable tub shaft 43 serves as the rotor shaft of the motor 52. Accordingly, the performance of the motor 52 cannot be checked or adjusted until the stator 54 is fixed to the bearing housing 41 and the rotor 53 is fixed to the rear end of the rotatable tub shaft 43. Accordingly, in the first embodiment, the motor performance can be checked or adjusted only when the overall driving mechanism 66 has been mounted on the rear of the water tub 26. In the second embodiment, however, the performance of the motor 52 in the motor unit 73 can be checked or adjusted before the motor unit is mounted on the rear of the water tub 26.

Figure 6:
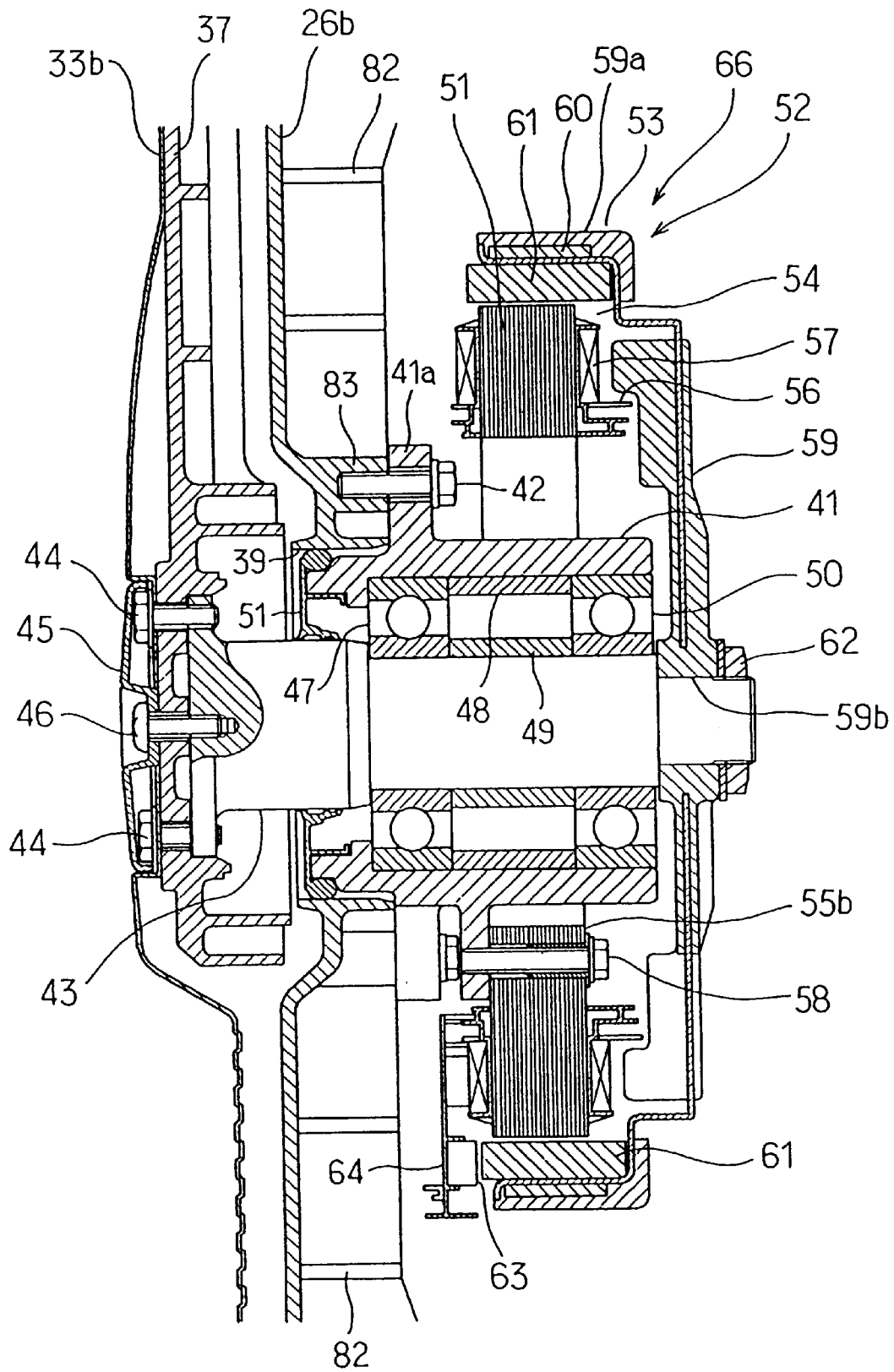
FIG. 6 is a view similar to FIG. 2, showing the drum type washing machine of a third embodiment in accordance with the invention.

FIG. 6 illustrates a third embodiment of the invention. The differences between the first and third embodiments will be described. Identical or similar parts are labeled by the same reference symbols in the third embodiment as in the first embodiment. In the third embodiment, the reinforcing plate 35 mounted on the rear end plate 26b of the water tub 26 is eliminated. The rear end plate 26b has a number of reinforcing ribs 82 and a plurality of bosses 83 one of which is shown in FIG. 6. The reinforcing ribs 82 are formed so as to sufficiently maintain the strength of the rear end plate 26b. The mounting portion 41a of the bearing housing 41 is mounted on the bosses 83 by the bolts 42, so that the bearing housing 41 is directly mounted on the rear end plate 26b of the water tub 26. Consequently, since the reinforcing plate 35 is unnecessary, the number of parts can be reduced and accordingly, the assembly can be simplified.

Figure 7:
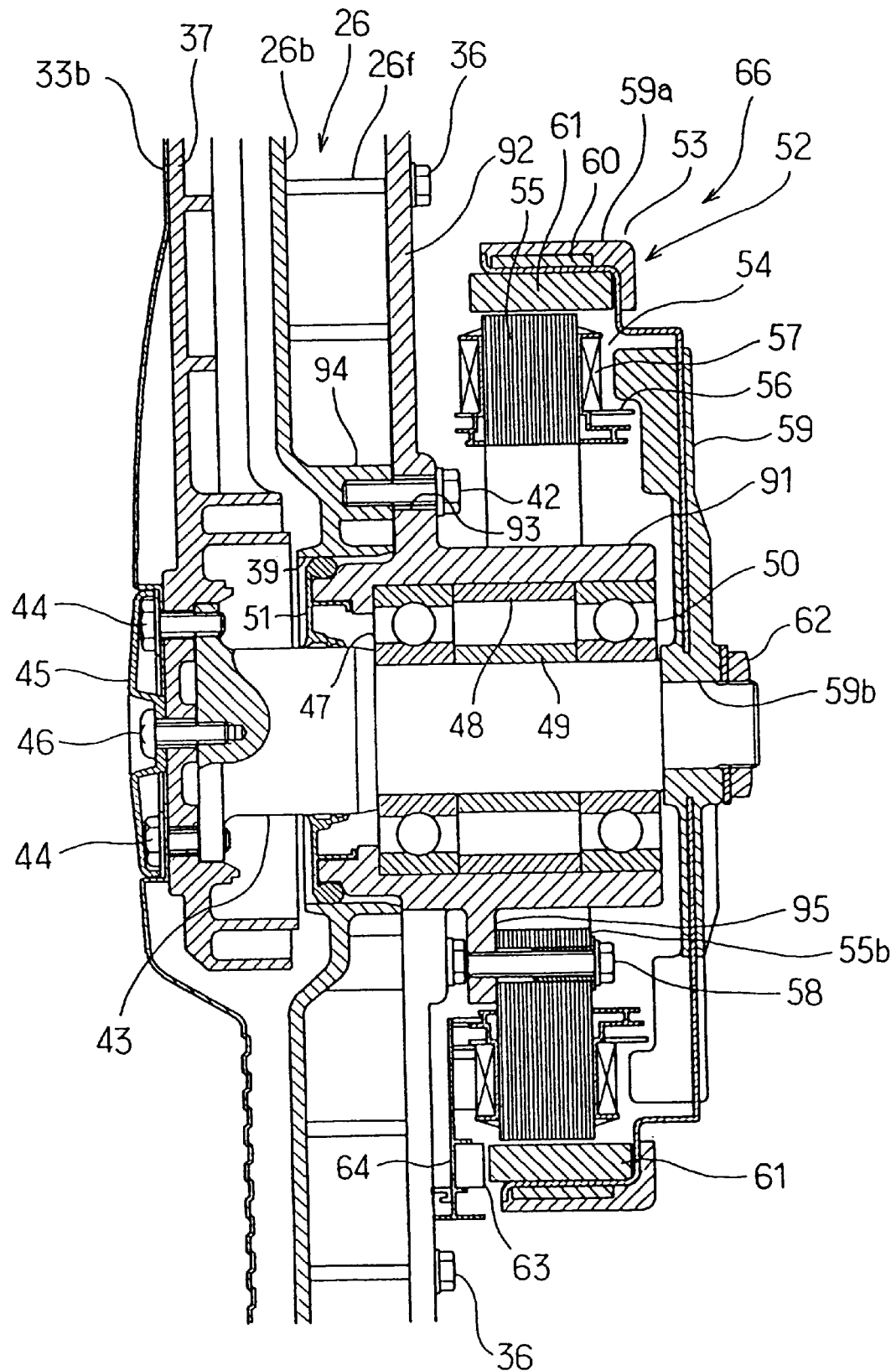
FIG. 7 is a view similar to FIG. 2, showing the drum type washing machine of a fourth embodiment in accordance with the invention.

FIG. 7 illustrates a fourth embodiment of the invention. The differences between the first and fourth embodiments will be described. Identical or similar parts are labeled by the same reference symbols in the fourth embodiment as in the first embodiment. In the fourth embodiment, the reinforcing plate 35 is eliminated, and a bearing housing 91 is directly mounted on the rear end plate 26b of the water tub 26, instead of the bearing housing 41. More specifically, the bearing housing 91 includes a reinforcing plate 92 formed integrally on the outer periphery thereof by means of die casting. The reinforcing plate 92 also serves as a mounting plate. The reinforcing plate 92 is formed with screw holes 93 each located near the bearing housing 91. The rear end plate 26b of the water tub 26 has bosses 94 formed to correspond to the screw holes 93 respectively. The screw holes 93 are positioned to be in accord with the bosses 94 and the screws 42 are screwed through the screw holes 93 into the bosses 94, respectively, so that the bearing housing 91 is mounted on the rear end plate 26b. Furthermore, the bearing housing 91 includes a plurality of stator mounting portions 95 formed integrally therewith so as to be located in the rear of the reinforcing plate 92. Only one of the stator mounting portions 95 is shown in FIG. 7.

According to the above-described construction, the reinforcing plate 92 and the bearing housing 91 are integrally formed. Consequently, the assembly can be simplified in the fourth embodiment as compared with the case where the reinforcing plate 35 and the bearing housing 41 are discrete from each other as in the first embodiment. The other construction in the fourth embodiment is the same as in the first embodiment. Accordingly, the same effect can be achieved in the fourth embodiment as in the first embodiment.

Figure 8:
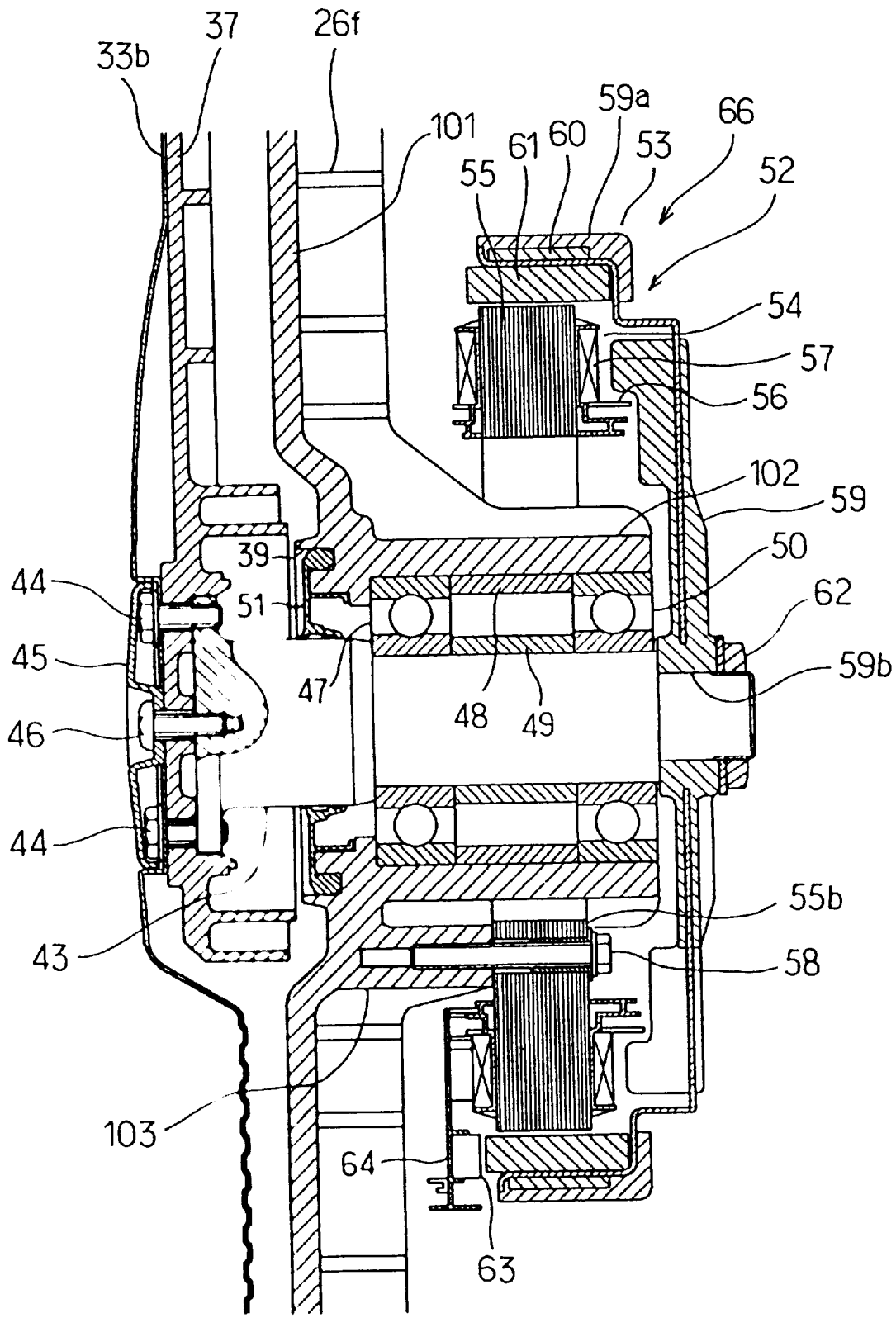
FIG. 8 is a view similar to FIG. 2, showing the drum type washing machine of a fifth embodiment in accordance with the invention.
Figure 9:
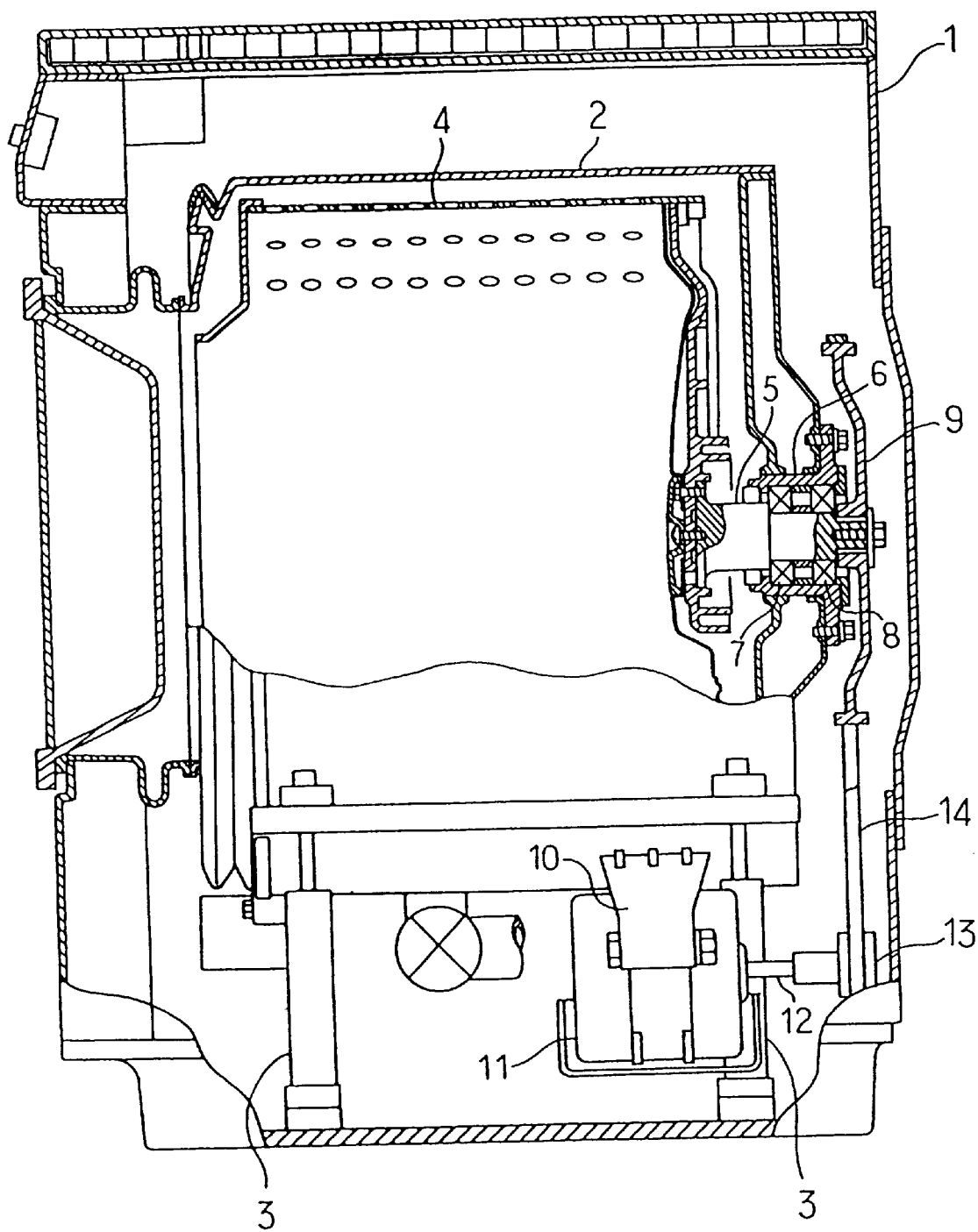
FIG. 9 is a view similar to FIG. 1, showing a drum type washing machine in accordance with the prior art.

FIG. 8 illustrates a fifth embodiment of the invention. The differences between the first and fifth embodiments will be described. Identical or similar parts are labeled by the same reference symbols in the fifth embodiment as in the first embodiment. In the fifth embodiment, a rear end plate 101 of the water tub 26 has a larger thickness than the rear end plate 26b. A bearing housing 102 is formed integrally on the rear end plate 101 by means of die casting. Furthermore, the rear end plate 101 has a plurality of bosses 103 formed so as to be located at the outer periphery of the bearing housing 102. Only one of the bosses 103 is shown in FIG. 8. The stator 54 is fixed to the bosses 103 by the screws 58.

According to the above-described construction, the number of parts can be reduced. Furthermore, since the bearing housing 92 need not be mounted on the rear end plate 101 of the water tub 26, the assembly can further be simplified.

In the foregoing fourth embodiment, the bearing housing 91, the ball bearings 47 and 50, the rotatable tub shaft 43, and the rotor 52 may be assembled integrally into the motor unit.

In each of the foregoing embodiments, the rotatable tub shaft 43 serves as the rotor shaft of the motor 52. The motor 52 may be provided with a rotor shaft, instead. Furthermore, the rotor shaft may be fixed to the rear end of the rotatable tub shaft 43.

The sequence for the assembly of the driving mechanism 66 should not be limited to that described above. The water tub 26 may be accommodated into the outer cabinet 21 after the driving mechanism 66 has been provided in the rear of the water tub 26, instead. In this case, the rotatable tub 33 is accommodated through the front opening 26e of the water tub 26 into the latter. The water tub 26 is accommodated into the outer cabinet 21 after the rear end plate 33b of the rotatable tub 33 and the support 37 have been fixed to the front end of the rotatable tub shaft 43.

The invention may be applied to washing machines in which a rotatable tub cannot be put into nor taken out of a water tub through front openings of the water tub and an outer cabinet. Furthermore, the invention may be applied to drum type washing machines without a drying function.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A drum type washing machine comprising:
   an outer cabinet;
   a water tub elastically supported in the outer cabinet;
   a drum type rotatable tub provided in the water tub to be rotated about a horizontal axis, the rotatable tub including an end plate having at least a central portion thereof provided with a generally flat mounting portion and the rotatable tub having portions defining a cavity;
   a rotatable tub shaft mounted to the rotatable tub outside the cavity and extending outward from the central portion of the end plate of the rotatable tub, the rotatable tub shaft having one of two ends located at the rotatable tub side and provided with a generally flat abutting portion which is caused to abut against the mounting portion of the end plate of the rotatable tub; and
   an outer rotor type motor driving the rotatable tub via the rotatable tub shaft and including a rotor mounted on the other end of the rotatable tub shaft and a stator fixed in relation to the water tub and disposed inside the rotor.

2. A drum type washing machine according to claim 1, wherein the rotatable tub shaft also serves as a rotor shaft of the motor.

3. A drum type washing machine according to claim 1, further comprising a bearing element which supports the rotatable tub shaft and includes a part thereof located in the stator.

4. A drum type washing machine according to claim 1, further comprising a bearing element which supports the rotatable tub shaft and a bearing housing holding the bearing element and mounted on a face of the water tub opposed to the end plate of the rotatable tub.

5. A drum type washing machine according to claim 1, wherein the outer cabinet and the water tub have front openings respectively and the rotatable tub is drawably accommodated through the front openings of the outer cabinet and the water tub into the water tub.

6. A drum type washing machine comprising:
   an outer cabinet;
   a water tub elastically supported in the outer cabinet;
   a drum type rotatable tub provided in the water tub to be rotated about a horizontal axis, the rotatable tub including an end plate having at least a central portion thereof provided with a generally flat mounting portion;
   a rotatable tub shaft extending outward from the central portion of the end plate of the rotatable tub, the rotatable tub shaft having one of two ends located at the rotatable tub side and provided with a generally flat abutting portion which is caused to abut against the mounting portion of the end plate of the rotatable tub and screwed thereto so that the rotatable tub shaft is mounted on the rotatable tub;
   an outer rotor type motor driving the rotatable tub via the rotatable tub shaft and including a rotor mounted on the other end of the rotatable tub shaft and a stator mounted on the water tub or a member fixed to the water tub so as to be disposed inside the rotor, the rotor having a circumferential wall with an inside on which a number of rotor magnets are mounted; and
   a detector detecting a rotational speed of the rotatable tub and mounted on the stator so as to be opposed to the rotor magnets.

7. A drum type washing machine according to claim 6, wherein the rotatable tub shaft also serves as a rotor shaft of the motor.

8. A drum type washing machine according to claim 6, further comprising a bearing element which supports the rotatable tub shaft and includes a part thereof located in the stator.

9. A drum type washing machine according to claim 6, further comprising a bearing element which supports the rotatable tub shaft and a bearing housing holding the bearing element and mounted on a face of the water tub opposed to the end plate of the rotatable tub.

10. A drum type washing machine according to claim 6, wherein the outer cabinet and the water tub have front openings respectively and the rotatable tub is drawably accommodated through the front openings of the outer cabinet and the water tub into the water tub.

11. A drum type washing machine according to claim 1, wherein the stator is mounted to one of the water tub or a member fixed to the water tub.

12. The drum type washing machine according to claim 1, wherein the abutting portion of the rotatable tub shaft is screwed to the mounting portion of the end plate of the rotatable tub.

* * * * *